(12) United States Patent
Wood

(10) Patent No.: US 7,562,846 B2
(45) Date of Patent: Jul. 21, 2009

(54) WINDOW RETAINING SYSTEM

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 11/271,419

(22) Filed: Nov. 10, 2005

(65) Prior Publication Data

US 2007/0102580 A1    May 10, 2007

(51) Int. Cl.
    *B64C 1/14*    (2006.01)
(52) U.S. Cl. .................................................. 244/129.3
(58) Field of Classification Search .............. 244/129.3, 244/117, 119; 52/204.5, 208, 204.593, 204.62; 296/190.1, 190.11
    See application file for complete search history.

(56) References Cited

U.S. PATENT DOCUMENTS

| | | | | |
|---|---|---|---|---|
| 2,388,786 A | * | 11/1945 | Knight et al. ................. 52/208 |
| 4,004,388 A | * | 1/1977 | Stefanik ................ 52/204.593 |
| 4,793,108 A | * | 12/1988 | Bain et al. .................... 52/208 |
| 5,088,257 A | * | 2/1992 | Loga et al. ............. 52/204.591 |
| 5,271,581 A | * | 12/1993 | Irish ........................ 244/129.3 |
| 6,199,798 B1 | * | 3/2001 | Stephan et al. ........... 244/129.4 |
| 6,889,938 B1 | | 5/2005 | Nordman |
| 2003/0066256 A1 | * | 4/2003 | DeBlock et al. ............... 52/208 |
| 2003/0234322 A1 | * | 12/2003 | Bladt et al. .............. 244/129.3 |

OTHER PUBLICATIONS

Pending patent application, filed on Nov. 2, 2005, Window Assembly for Aircraft Fuselage, Inventor Jeffrey H. Wood.
Pending patent application, filed Oct. 28, 2005, Window Assembly Retaining System, Inventor Jeffrey H. Wood.
U.S. Appl. No. 11/143,287, Sealed Structural Passenger Window Assembly and Method of Forming Same, Chris H. Balsillie et al., 33 pages.

* cited by examiner

*Primary Examiner*—Tien Dinh
(74) *Attorney, Agent, or Firm*—Rozenblat IP LLC

(57) ABSTRACT

A window assembly and method for its installation is provided. The window assembly may include multiple transparent panels covering an opening of an aircraft fuselage. A clip member may be utilized to secure one or more of the transparent panels in place. The clip member may be slideably disposed against a retainer member, and may be adapted to lock in place relative to the retainer member in engaged and disengaged positions.

24 Claims, 9 Drawing Sheets

US 7,562,846 B2

WINDOW RETAINING SYSTEM

BACKGROUND OF THE DISCLOSURE

Most current passenger aircraft window systems comprise multiple panes of acrylic that are coupled together in a multi-piece sheet metal attachment structure. Typically, this structure is installed from the interior of the aircraft and is not maintenance friendly since the passenger seats and aircraft interior wall fascia panels must be removed for access to the window system. Often, the window systems require a deep envelope in the fuselage to accommodate the bulky sheet metal structure holding the multi-pane window.

Many next generation aircraft incorporate transparent structural panels fastened around apertures in the fuselage skin to allow occupants of the aircraft to look through the transparent panels. The panels are typically attached directly to the inside of the fuselage skin. These panels often require external fairing panes to fill in the gap between the inside surface of the skin and the outside surface of the skin in order to provide an aerodynamically smooth surface on the outside surface of the fuselage. The external fairing panes may provide for noise abatement, a thermal barrier, and an abrasion resistant barrier for the internally mounted transparent panel.

The fairing pane attachment system for these next generation aircraft typically must fit inside an envelope equal to the thickness of the fuselage skin, and be capable of allowing installation of the fairing pane from the outside surface of the aircraft fuselage for quick replacement and easy maintenance. Conventional solutions for attaching the outer protective fairing pane have typically been to utilize a picture frame to encase the fairing pane, and fasteners for attachment to the aircraft structure. However, utilizing a picture frame, which generally comprises a raised step around the fairing pane aperture, may not supply a smooth aerodynamic surface on the exterior surface of the fuselage, and may induce drag and reduce performance. Moreover, attachment of fasteners is usually required. Installation of fasteners may be time consuming, may require torque specifications for proper attachment, and may require a maintenance person to remove gloves in order to perform necessary maintenance. Additionally, fasteners may be dropped during maintenance and may cause foreign object damage (FOD) to aircraft systems.

A window assembly and method for its installation is required which will allow for efficient installation of fairing panes from the outside of the aircraft fuselage in a space-challenged envelope. This window assembly may also be utilized in non-aircraft applications.

SUMMARY OF THE DISCLOSURE

In one aspect of the present disclosure, a window assembly for an aircraft fuselage may include a first transparent panel, a second transparent panel, and at least one clip member. The first transparent panel may cover at least a portion of an opening in the aircraft fuselage. The clip member may be adapted to be at least partially disposed over at least a portion of the second transparent panel in an engaged position and adapted to not be disposed over the portion of the second transparent panel in a disengaged position.

In another aspect of the present disclosure, a window assembly for an aircraft fuselage may include a first transparent panel, a second transparent panel, a first retainer member, and a clip member. The first transparent panel may cover at least a portion of an opening in the aircraft fuselage. The first retainer member may include at least one of a first female portion and a first male portion, while the clip member may include at least one of a second female portion and a second male portion. At least one of the first female and first male portion of the retainer member may be adapted to interlock with at least one of the second female and second male portion of the clip member.

In a further aspect of the present disclosure, a method is provided for forming a window assembly on an aircraft fuselage having an opening. A clip member and first and second transparent panels are provided. The first transparent panel may be placed over at least a portion of the opening. The second transparent panel may be placed over at least a portion of the first transparent panel while the clip member can be in a disengaged position. The clip member may be placed in an engaged position to secure the second transparent panel in place.

These and other features, aspects and advantages of the present disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
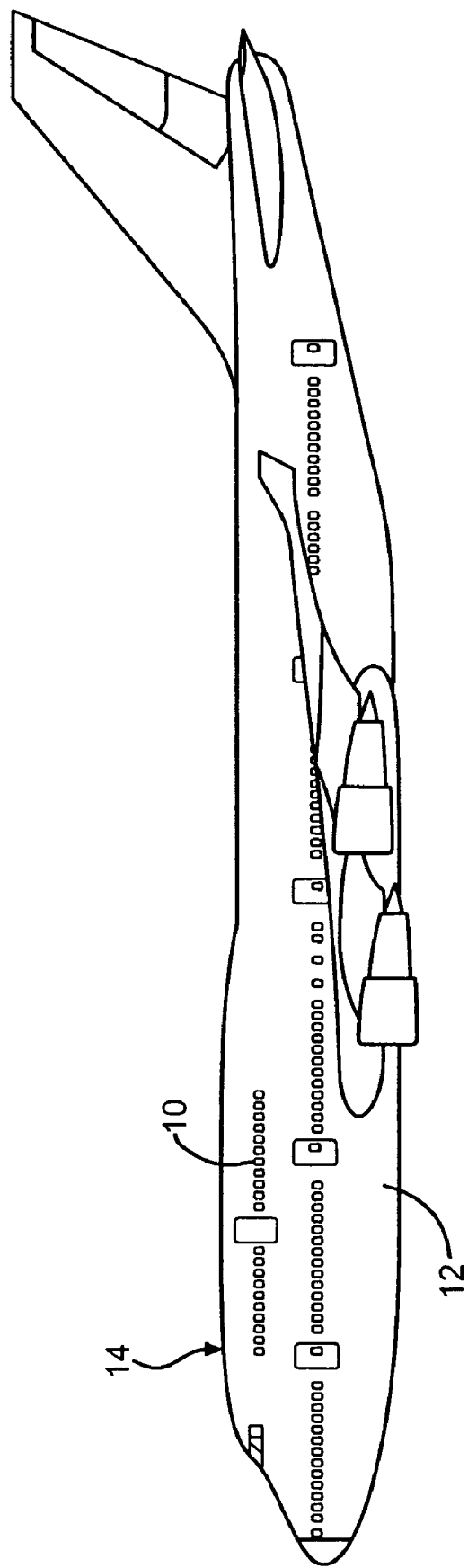
FIG. 1 is a perspective view of an aircraft incorporating a window assembly in accordance with the present disclosure.

Referring to FIG. 1, a plurality of window assemblies 10, in accordance with a preferred embodiment of the present disclosure, are illustrated as incorporated into a fuselage 12 of an airplane 14. The structural and operational properties of the window assembly 10 are especially well suited for use with aircraft, where the window assembly 10 is exposed to significant changes in thermal conditions and air pressure, as well as impacts from foreign objects. In other embodiments, the window assembly 10 may be implemented in non-aircraft applications, such as buses, trains, and ships.

Figure 2:
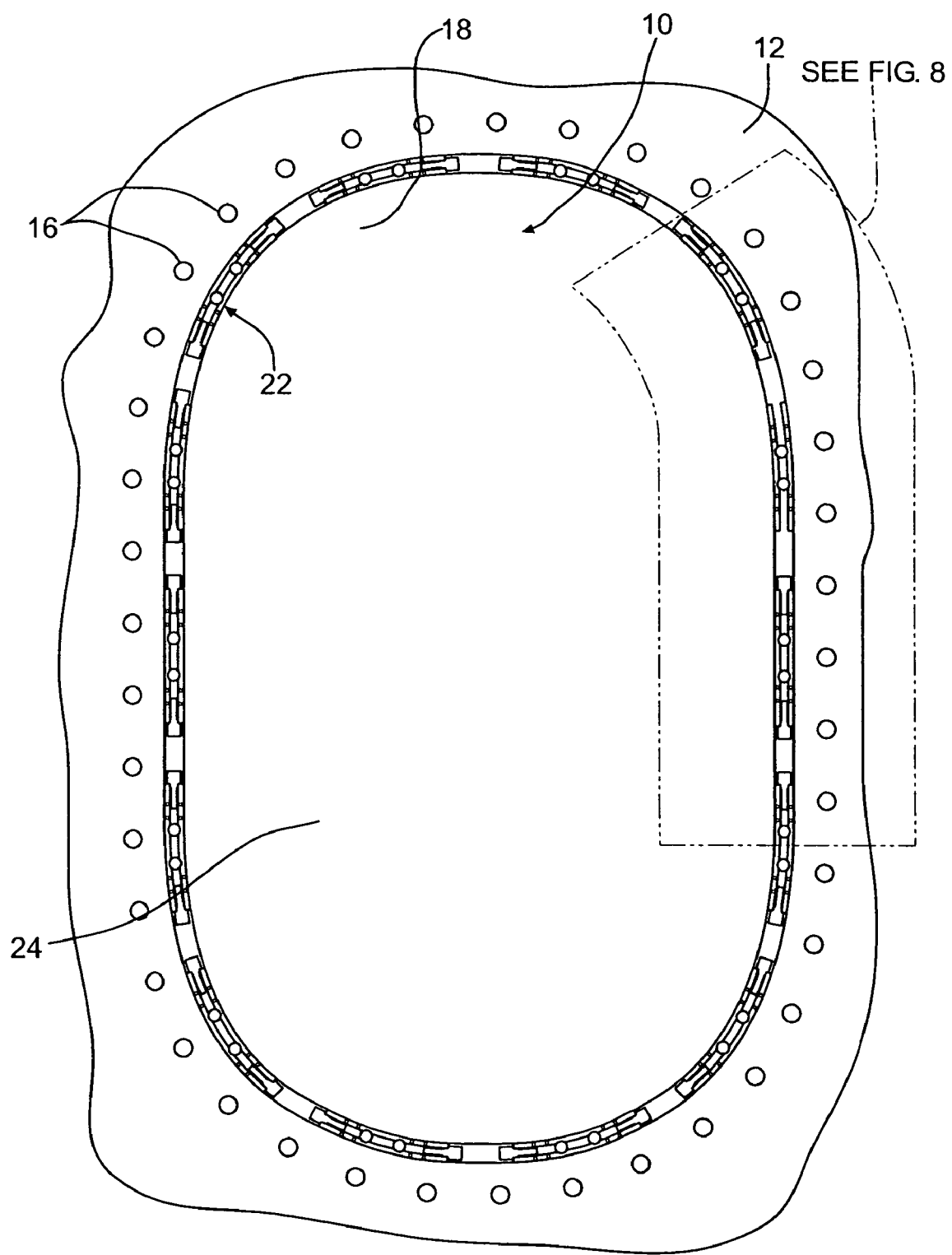
FIG. 2 is an enlarged plan view of one of the windows of the aircraft of FIG. 1.

FIG. 2 depicts an enlarged view of one of the window assemblies 10. The window assembly 10 may be held to the fuselage 12 by a plurality of fastening elements 16 spaced circumferentially around an opening 18 in which the window assembly 10 can be installed. The fastening elements 16 can extend through pre-formed openings in the fuselage 12. A retainer assembly 22 may retain the outer transparent panel 24 in place.

Figure 3:
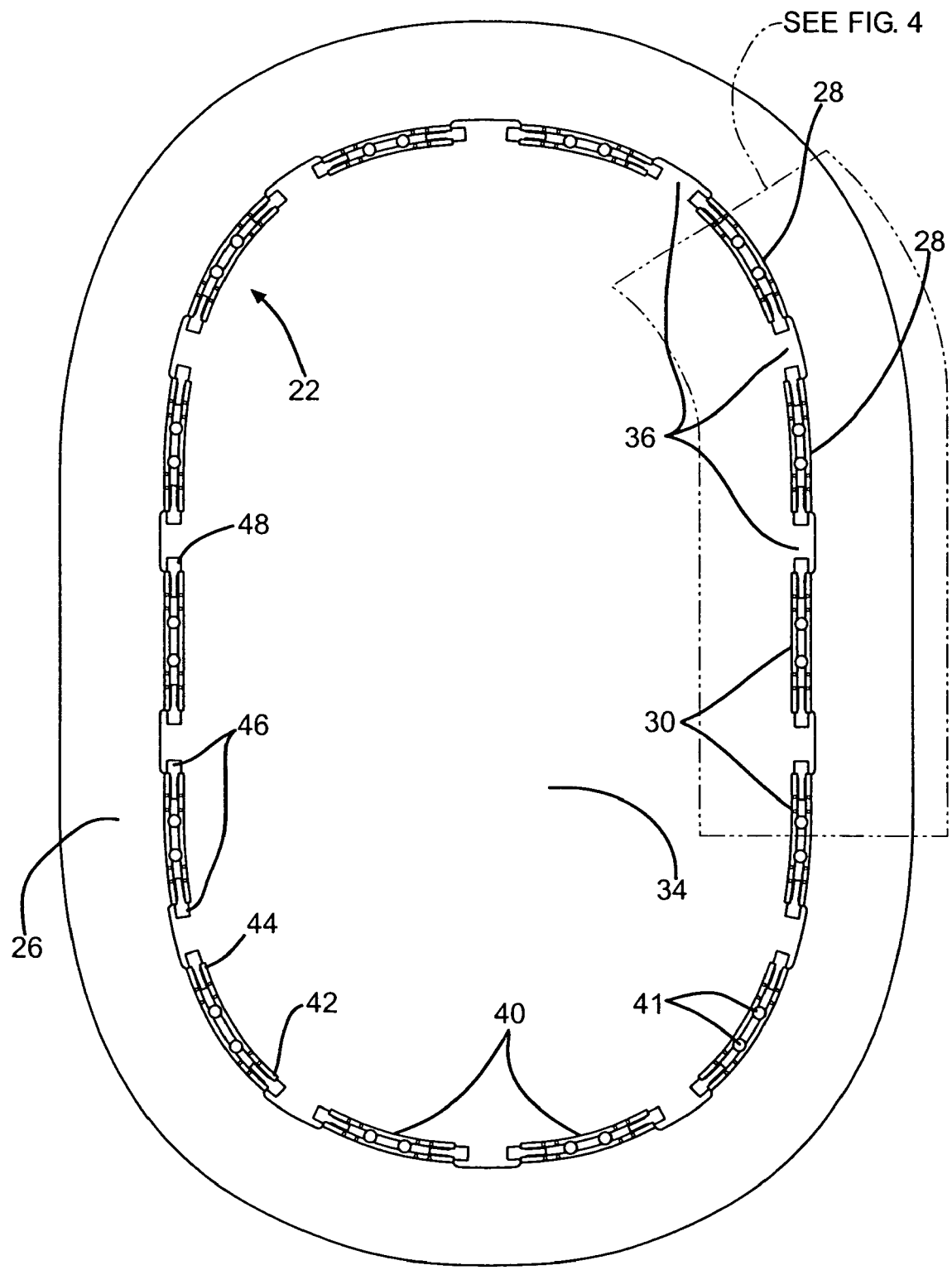
FIG. 3 is a partial plan view of the retainer assembly of FIG. 2 without the transparent panels.
Figure 4:
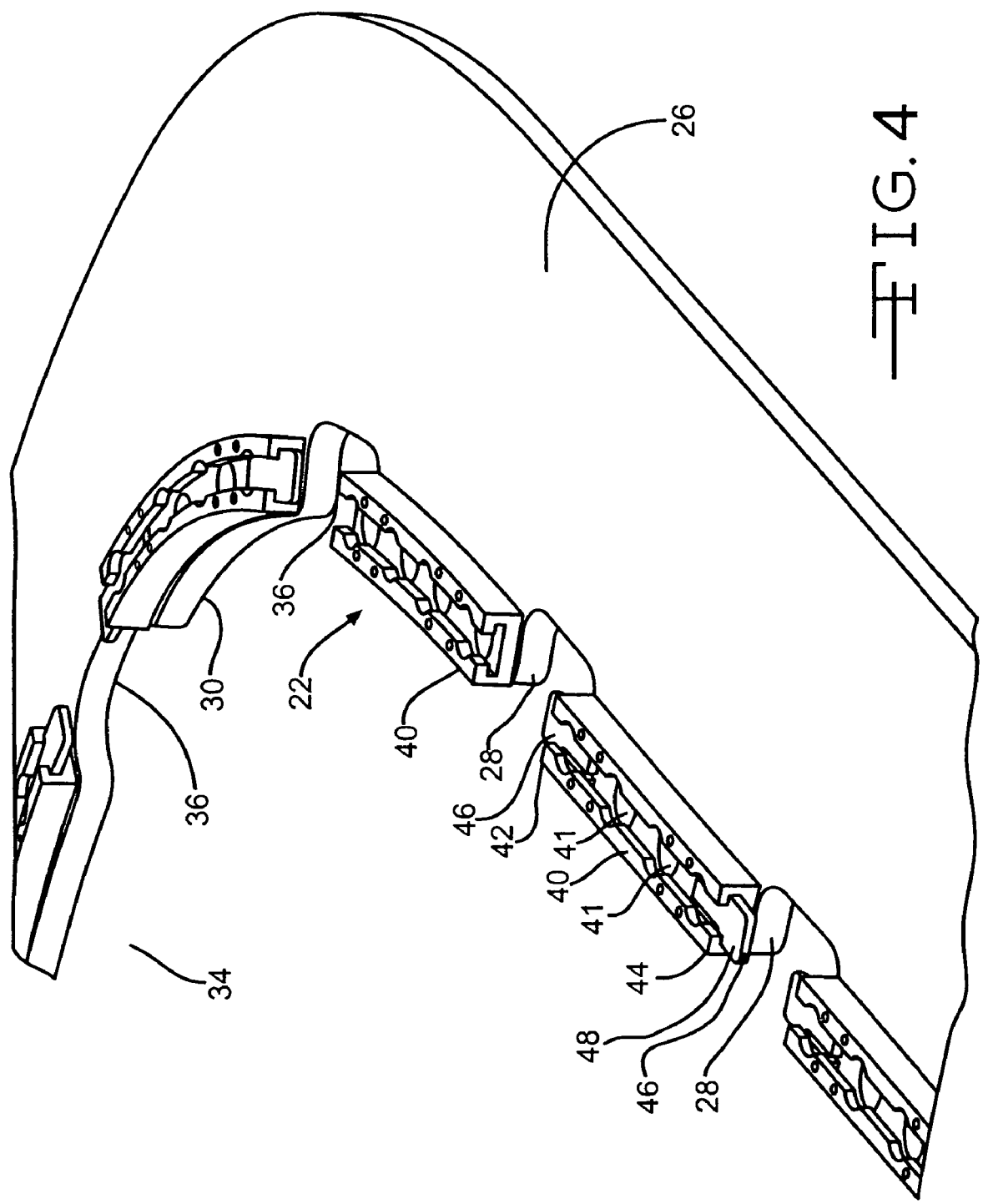
FIG. 4 is an enlarged perspective view of the dotted line area of FIG. 3 showing clip members in engaged (extended) positions.

FIG. 3 shows a partial plan view of the retainer assembly 22 of FIG. 2 attached to a composite filler plate 26. FIG. 4 depicts an enlarged perspective view of the dotted line area of FIG. 3 showing a portion of the retainer assembly 22 in more detail. As shown in FIGS. 3 and 4, the composite filler plate 26 may include fourteen tab members 28 extending around an inner surface 30 of the filler plate 26, and is defined by an opening 34 and by fourteen apertures 36 disposed between the tab members 30. The carbon filler plate 26 may be made of a carbon fiber and resin or other materials known in the art. The retainer assembly 22 may include fourteen retainer members 40, each fastened 41 to a respective tab member 30 around the periphery of the opening 34. The retainer members 40 are preferably Aluminum or another metallic but may be made of any material known in the art. At each of the two opposing ends 42 and 44 of each retainer member 40, a clip member 46 may be connected to the retainer member 40, for a total of twenty-eight clip members 46 disposed around the retainer assembly 22. As shown, while in an engaged (extended) position, a portion 48 of each clip member 46 extends past an end 42 or 44 of its respective retainer member 40 and at least partially over an aperture 36. The clip members 46 are preferably Titanium or Stainless Steel, but may be made of any material known in the art.

Figure 5:
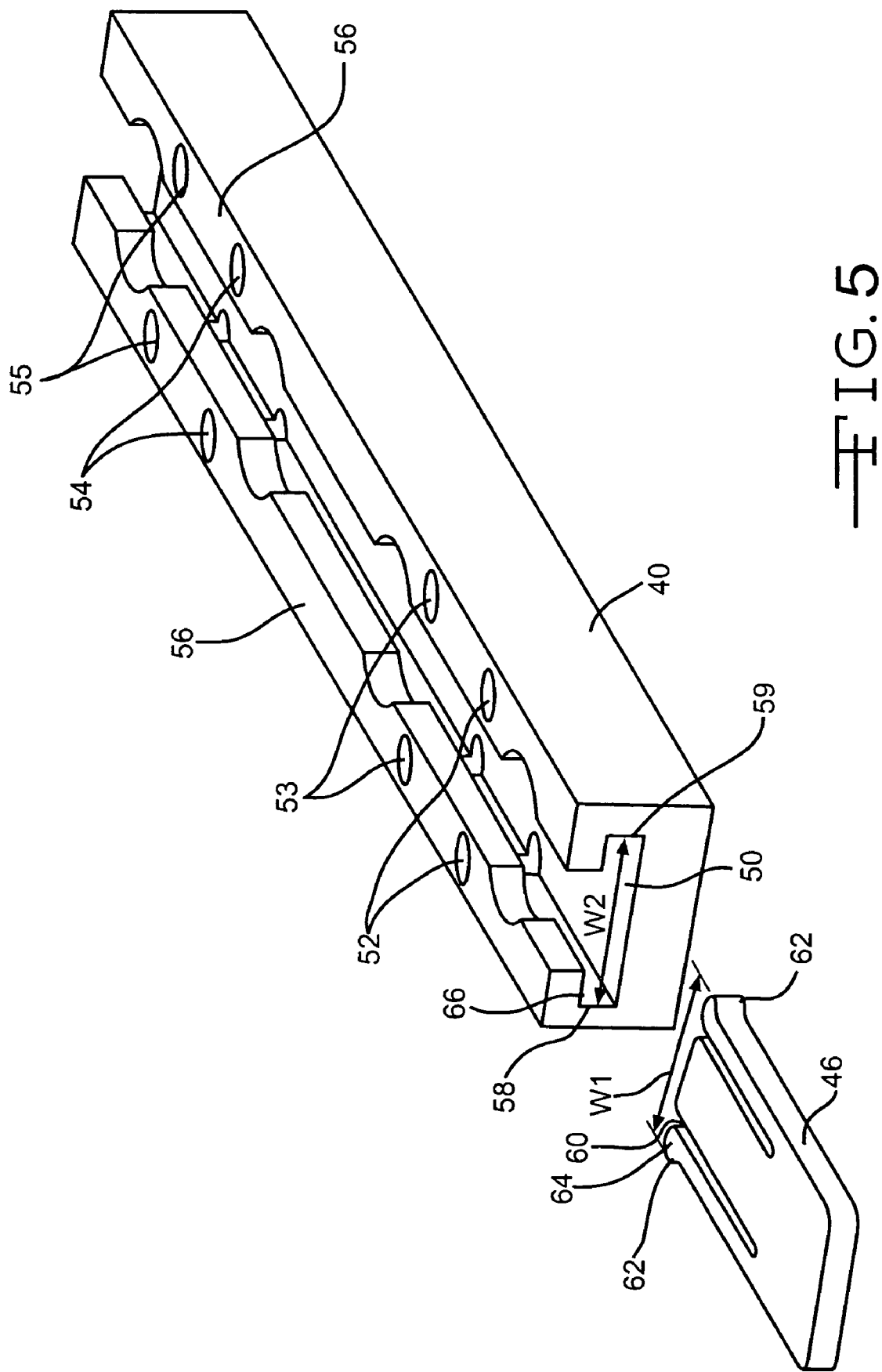
FIG. 5 is an enlarged perspective view of a retainer member of FIG. 4 showing a clip member being inserted.

FIG. 5 shows an enlarged perspective view of a retainer member 40 of FIG. 4 with a clip member 46 about to be inserted into a t-shaped internal trough 50 of the retainer member 40. Four sets of retainer holes 52, 53, 54, and 55 are drilled through a top surface 56 of the retainer member 40, at least partially into side surfaces 58 and 59 of the retainer member 40. In other embodiments, the retainer holes 52, 53, 54, and 55 may be in a variety of numbers and configurations and may comprise surface indentations which may or may not comprise through-holes. The clip member 46 can be defined by two slots 60 and two spring tabs 62 disposed outwardly. When the spring tabs 62 are fully extended outwardly, the width w1 of the end 64 of the clip member 46 may become wider than the width w2 of the end 66 of the trough 50. In other embodiments, the retainer member 40, and clip member 46 may be in a variety of shapes and configurations, and the trough 50 may be internal or external in any number of shapes, sizes, and configurations.

Figure 6:
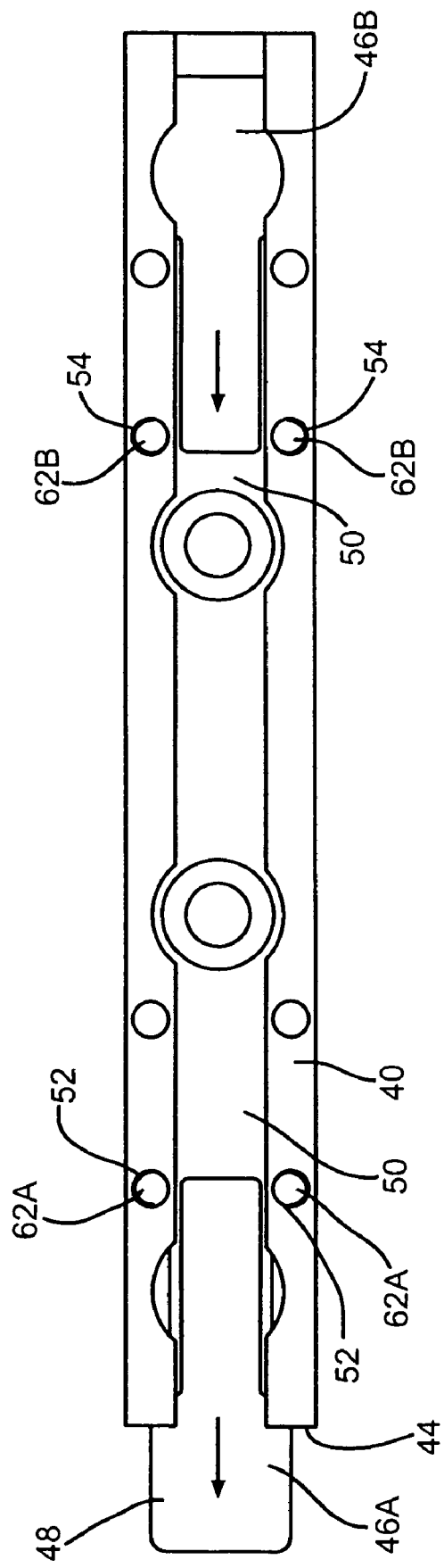
FIG. 6 is a top view of the retainer member of FIG. 5 showing one clip member in an engaged (extended) position and one clip member in a disengaged (retracted) position.

FIG. 6 is a top view of the retainer member 40 of FIG. 5 showing one clip member 46A partially disposed within the trough 50 of the retainer member 40 in an engaged (extended) position, and showing one clip member 46B completely disposed within the trough 50 of the retainer member 40 in a disengaged (retracted) position. The clip members 46A and 46B may be adapted to be slideably disposed within the trough 50. As shown, when the clip member 46A is in an engaged position, the spring tabs 62A may snap into the set of retainer holes 52 to interlock and secure the clip member 46A with a portion 48 of the clip member 46A extending past an end 44 of the retainer member 40. If the clip member 46B is in a disengaged position, the spring tabs 62B may snap into the set of retainer holes 54 to interlock and secure the clip member 46B completely within the trough 50. In other embodiments, the clip members 46 may be engaged or disengaged from the retainer member 40 using a variety of configurations and types of interlocking male and female portions (such as any type of male member and female hole on both the clip members 46 and retainer member 40), mechanisms, or methods.

Figure 7:
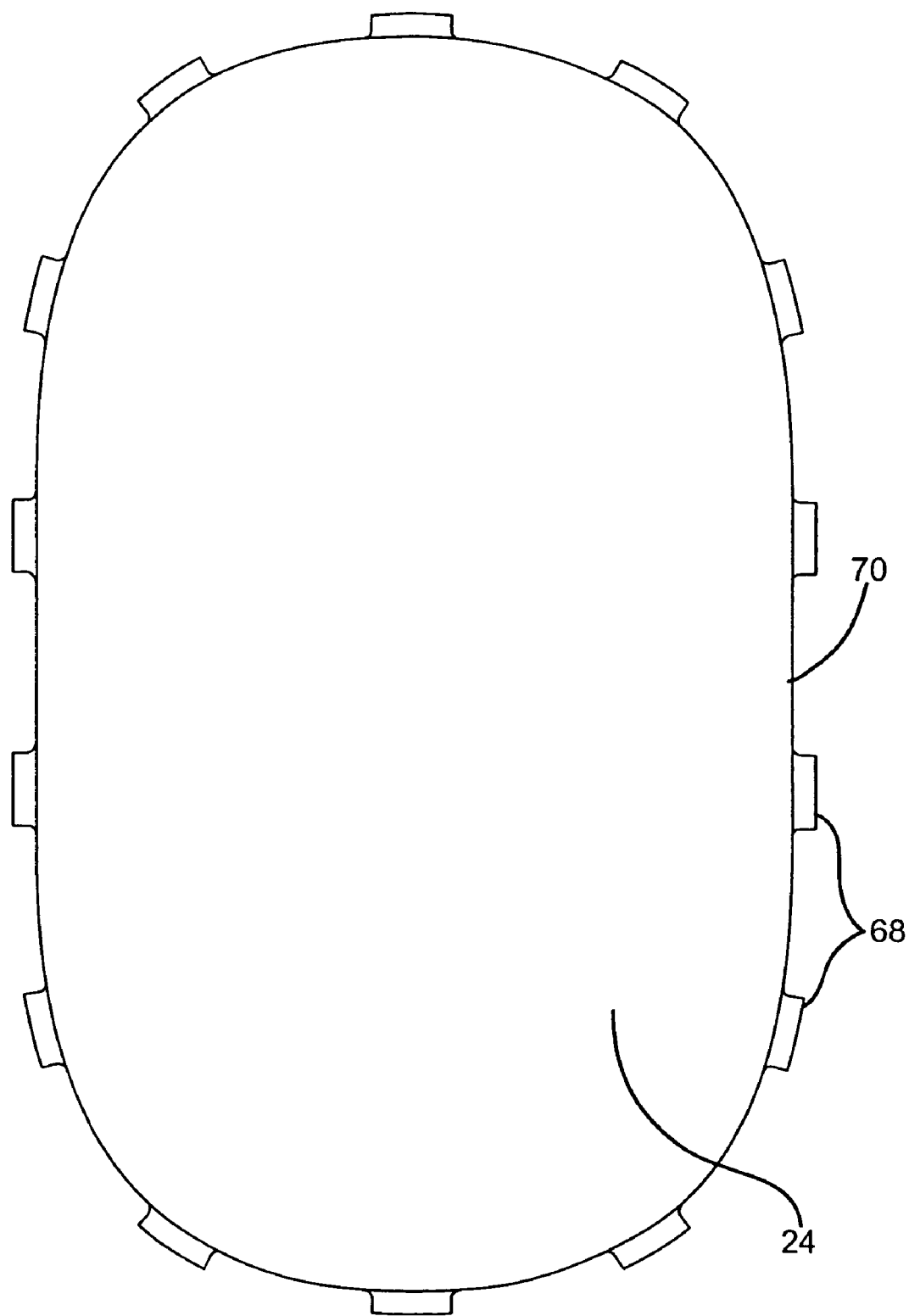
FIG. 7 is a top view of the outer transparent panel of FIG. 2.

FIG. 7 depicts a top view of the outer transparent panel (or fairing pane) 24 of FIG. 2. Fourteen molded tabs 68 may be disposed around a periphery of the outer surface 70 of the outer transparent panel 24. In other embodiments, the outer transparent panel 24 may be in varying configurations. The outer transparent panel 24 is preferably acrylic but may be made of any transparent material known in the art such as glass and a composite.

Figure 8:
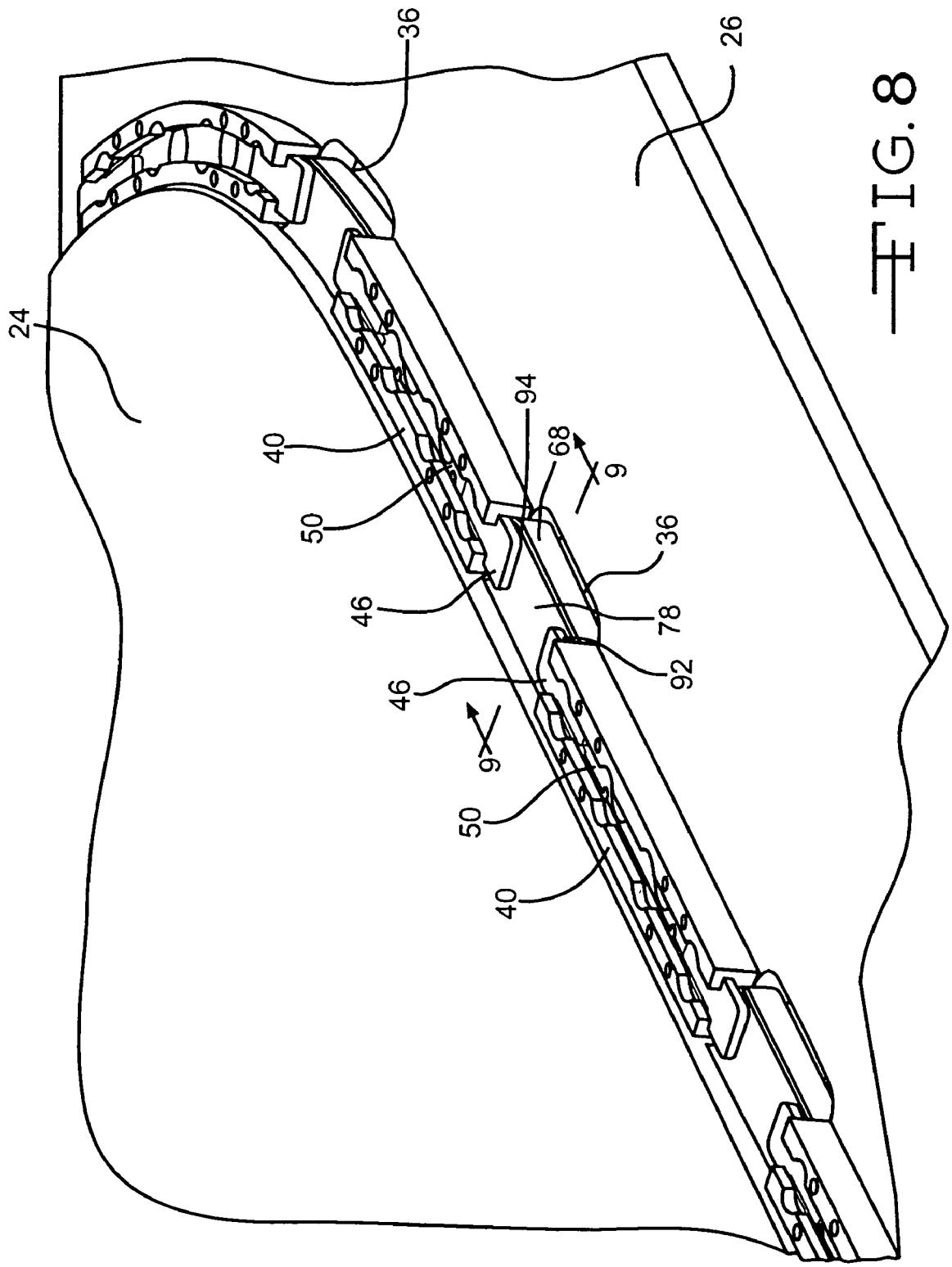
FIG. 8 is an enlarged perspective view of the dotted line area of FIG. 2 showing the clip members in engaged (extended) positions.
Figure 9:
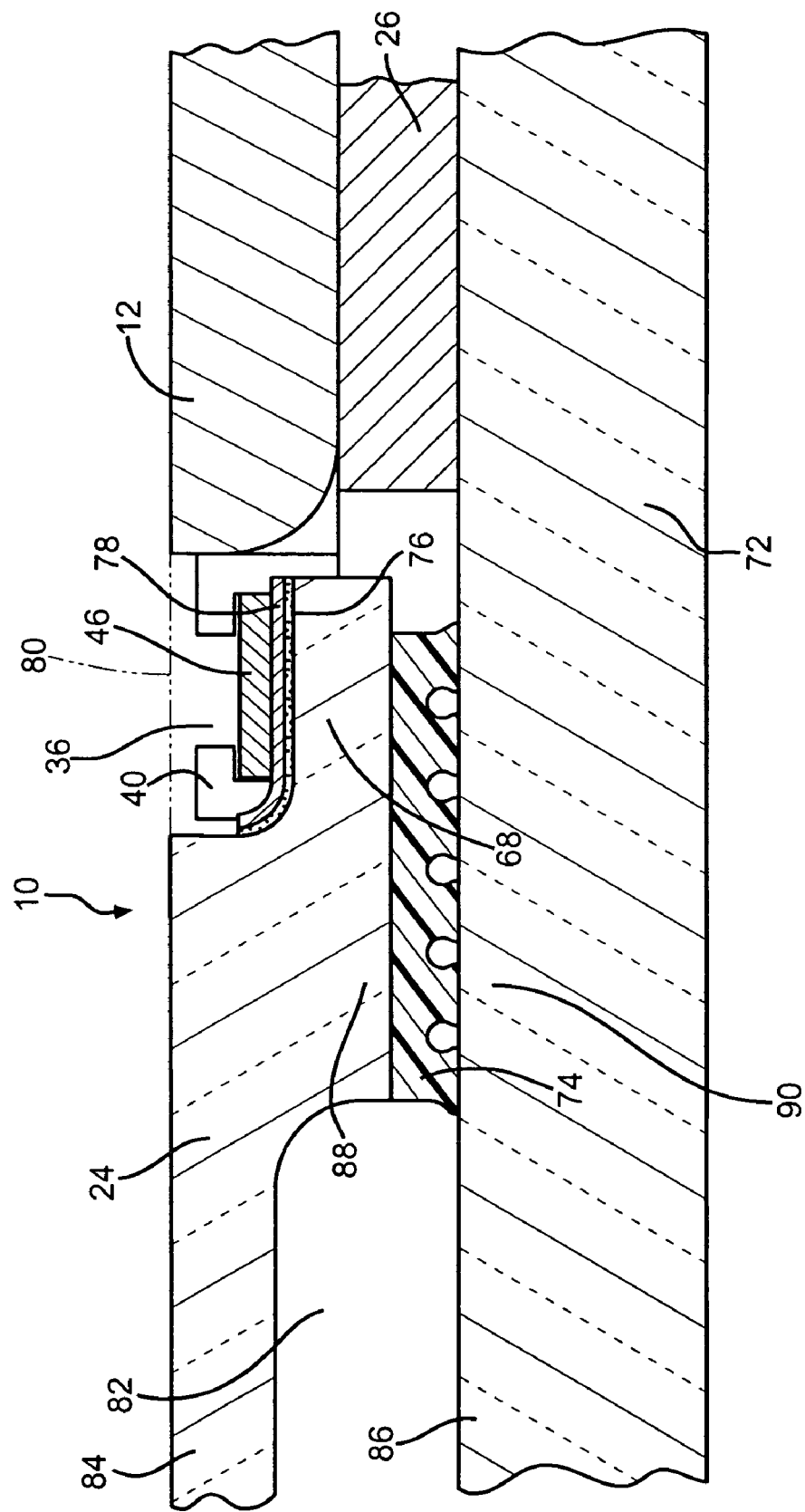
FIG. 9 is a partial cross-sectional view along lines 9-9 of FIG. 8.

FIG. 8 is an enlarged perspective view of the dotted line area of FIG. 2 showing the clip members 46 in engaged (extended) positions, while FIG. 9 is a partial cross-sectional view along line 9-9 of FIG. 8. Collectively, FIGS. 8 and 9 illustrate the assembly of the internal transparent panel 72, the Silicone seal 74, the composite filler plate 26, the outer transparent panel 24 and its associated tabs 68, the Polysulphide adhesive 76, the slip plate 78, the clip members 46, the retainer members 40, the fuselage 12, and the outer seal 80. The outer seal 80 may provide access to the window assembly 10 when removed from the fuselage 12. The internal transparent panel 72 is preferably disposed on the interior of the airplane and may be made of a composite, but in other embodiments, may comprise any transparent material known in the art such as glass or acrylic. A vented cavity 82 may be disposed between a portion 84 of the outer transparent panel 24 and a portion 86 of the internal transparent panel 72. The vented cavity 82 may be vented to the outside atmosphere thus reducing loads on the outer transparent panel 24. A silicone seal 74 may be disposed between a portion 88 of the outer transparent panel 24 and a portion 90 of the internal transparent panel 72. The seal 74 aids in sealing the window assembly 10, and in other embodiments, may be made of varying materials known in the art. The composite filler plate 26 may be disposed between the internal transparent panel 72 and the outer skin of the aircraft fuselage 12.

As shown, when assembled, each of the fourteen tabs 68 of the outer transparent panel 24 are disposed in between two retainer members 40 and over corresponding apertures 36 in the filler plate 26. Polysulphide adhesive 76 is disposed between each of the fourteen tabs 68 of the outer transparent panel 24 and each of the fourteen corresponding slip plates 78. The slip plates 78 are preferably Stainless Steel or Aluminum, but in other embodiments may comprise other materials known in the art. Two secured clip members 46, extending from troughs 50 of opposing retainer members 40, may be disposed partially over opposing ends 92 and 94 of each slip plate 78. As such, the outer transparent panel 24 may be fixedly secured in position due to each of the fourteen tabs 68 of the outer transparent panel 24 being held in place by the fourteen respective slip plates 78 and fourteen respective pairs of clip members 46. The use of fourteen pairs of clip members 46 may provide redundant retention in the possibility that a clip member 26 is installed improperly or fails. Moreover, the use of slip plates 78 may prevent the tabs 68 of the outer transparent panel 24 from disengaging from the clip members 46 when internal pressure is experienced, and also may distribute the bearing loads uniformly across the tabs 68 to largely eliminate fracture of the tabs 68 underneath the clip members 46.

During installation of the window assembly 10, the internal transparent panel 72 may be placed over the opening in the aircraft fuselage 12. Each of the respective clip members 46 may be retracted within the troughs 50 of the respective retainer members 40 into their disengaged positions allowing the outer transparent panel 24 to be positioned over the internal transparent panel 72. The clip members 46 may be retracted within the troughs 50 by inserting a flat surface, such as a flat blade or tip of a screwdriver, into the troughs 50 against an end of the clip members 46 and using the flat surface to force the clip members 46 to slide within the troughs 50. When the clip members 46 are fully retracted within the troughs 50 in their disengaged positions, the clip members 46 may be secured in place as a result of the spring tabs 62 of the clip members 46 being snapped into the retainer holes 53 and 54 within the troughs 50. The outer transparent panel 24 may be placed over the internal transparent panel 72 with each of the fourteen tabs 68 of the outer transparent panel 24 disposed in between two retainer members 40 and over corresponding apertures 36 in the filler plate 26. Polysulphide adhesive 76 may be applied to each of the fourteen tabs 68 of the outer transparent panel 24.

The fourteen respective slip plates 78 may be positioned over each of the respective adhesive strips 76 and tabs 68. Each of the twenty-eight clip members 46 may then be extended into their engaged positions, again utilizing a flat surface to force the clip members 46 to slide within the troughs 50, so that a portion 48 of each clip member 46 extends past an end 42 or 44 of its respective retainer member 40 and at least partially over respective aperture 36 to secure the slip plates 78 and tabs 68 in place. In their engaged positions, the clip members 46 may be secured in place as a result of the spring tabs 62 of the clip members 46 being snapped into the retainer holes 52 and 55 within the troughs 50. As a result, the outer transparent panel 24 may be fixedly secured within the window assembly 10. The outer seal 80 may then be secured to seal the window assembly 10. To later unsecure the outer transparent panel 24, the outer seal 80 may be removed, and each of the clip members 46 are retracted within the troughs 50 using a flat surface to allow the outer transparent panel 24 to be removed from the window assembly 10.

In other embodiments, a varying number of clip members 46, retainer members 40, troughs 50, and slip plates 78 may be utilized in a variety of configurations to secure and unsecure various parts of the window assembly 10. In still other embodiments, differing configurations, types of parts, locations, and assembly mechanisms may be used for the present disclosure.

The disclosure may allow for an outer transparent panel 24 to be installed or replaced without the use of fasteners, and without the use of costly tools. As a result, the disclosure may allow for more time effective, efficient, and less costly installation and maintenance of window assemblies 10.

It should be understood, of course, that the foregoing relates to exemplary embodiments of the disclosure and that modifications may be made without departing from the spirit and scope of the disclosure as set forth in the following claims.

I claim:

1. A window assembly for an aircraft fuselage comprising:
a first transparent panel covering at least a portion of an opening in the aircraft fuselage;
a second transparent panel;
a first retainer member defined by a trough; and
at least one clip member which is configured to be moved from an engaged position to a disengaged position, wherein in the engaged position the at least one clip member extends partially out of the trough against the second transparent panel securing the second transparent panel in place over the opening, and in the disengaged position the at least one clip member is retracted completely within the trough allowing the second transparent panel to be removed from the opening.

2. The window assembly of claim 1, wherein said at least one clip member is at least partially disposed over at least a portion of said second transparent panel in said engaged position and is not disposed over said portion of said second transparent panel in said disengaged position.

3. The window assembly of claim 2, wherein said portion of said second transparent panel comprises at least one tab.

4. The window assembly of claim 1, wherein at least one of said first and second transparent panels is made of one of glass, Acrylic, and a composite.

5. The window assembly of claim 1, wherein said at least one clip member is made of one of Stainless Steel and Titanium.

6. The window assembly of claim 1, wherein said at least one clip member is substantially straight.

7. The window assembly of claim 6, wherein said at least one clip member is disposed parallel to said trough in each of said engaged and disengaged positions.

8. The window assembly of claim 1, wherein said at least one clip member is configured to slide from the engaged position extending partially out of the trough to the disengaged position completely retracted within the trough.

9. The window assembly of claim 1, wherein the window assembly does not comprise any fasteners.

10. The window assembly of claim 1, wherein said at least one clip member is fixedly secured to said first retainer member in at least one of the engaged position and the disengaged position.

11. The window assembly of claim 10, wherein said first retainer member and said at least one clip member collectively comprise female and male portions.

12. The window assembly of claim 11, wherein said female and male portions are adapted to interlock.

13. The window assembly of claim 1 further comprising a slip plate adapted to be disposed between at least a portion of said at least one clip member and a portion of said second transparent panel.

14. A window assembly for an aircraft fuselage comprising:
a first transparent panel covering at least a portion of an opening in the aircraft fuselage;
a second transparent panel;
a first retainer member; and
a substantially straight clip member, wherein the first retainer member and the substantially straight clip member collectively comprise interlocking female and male portions for interlocking together, and wherein at least one of: (A) said first retainer member is defined by at least one indentation, and said substantially straight clip member comprises at least one spring tab; and (B) wherein the first retainer member is defined by a trough, and the substantially straight clip member is configured to be moved from an engaged position to a disengaged position, wherein in the engaged position the substantially straight clip member extends partially out of the trough against the second transparent panel securing the second transparent panel in place over the opening, and in the disengaged position the substantially straight clip member is retracted within the trough allowing the second transparent panel to be removed from the opening.

15. The window assembly of claim 14, wherein said first retainer member is defined by the at least one indentation, and said substantially straight clip member comprises said at least one spring tab.

16. The window assembly of claim 15, wherein said at least one spring tab is adapted to interlock with said at least one indentation.

17. The window assembly of claim 16, wherein said first retainer member is defined by the trough, said at least one indentation defines said trough, and said at least one spring tab is adapted to interlock with said at least one indentation within said trough.

18. The window assembly of claim 14, wherein said at least one substantially straight clip member is made of one of Stainless Steel and Titanium.

19. The window assembly of claim 14, wherein at least a portion of said substantially straight clip member is slideably disposed within said retainer member.

20. The window assembly of claim 14, wherein said substantially straight clip member is adapted to at least partially be disposed over at least a portion of said second transparent panel in the engaged position and adapted to not be disposed over said portion of said second transparent panel in the disengaged position.

21. The window assembly of claim 14, wherein the first retainer member is defined by the trough, and the substantially straight clip member is configured to be moved from the engaged position to the disengaged position, wherein in the engaged position the substantially straight clip member extends partially out of the trough against the second transparent panel securing the second transparent panel in place over the opening, and in the disengaged position the substantially straight clip member is retracted completely within the trough allowing the second transparent panel to be removed from the opening.

22. The window assembly of claim 21, wherein said substantially straight clip member is disposed parallel to said trough in each of said engaged and disengaged positions.

23. The window assembly of claim 21, wherein said substantially straight clip member is configured to slide from the engaged position extending partially out of the trough to the disengaged position completely retracted within the trough.

24. The window assembly of claim 21, wherein the window assembly does not comprise any fasteners.

* * * * *